United States Patent Office 3,248,441
Patented Apr. 26, 1966

3,248,441
HIGH TEMPERATURE HYDROCARBON REACTIONS
Frederick J. Soderquist, Essexville, and Raymond J. Ladd, Midland, Mich., assignors to The Dow Chemical Company, Midland, Mich., a corporation of Delaware
No Drawing. Filed May 8, 1963, Ser. No. 278,994
2 Claims. (Cl. 260—669)

This invention relates to an improved method of performing high temperature hydrocarbon processes. More particularly, this invention relates to an improved containing material for high temperature hydrocarbon processes.

A common phenomenon associated with processes in which hydrocarbons are heated to high temperatures is the formation of carbon. Formation of carbon results in a loss of useful product materials. Formation and accumulation of carbon within reactors and other equipment employed in high temperature hydrocarbon reactions lowers efficiency and may be sufficient to entirely block flow within the reactor or other equipment. Undesirable formation and accumulation of carbon in reactors or other high temperature equipment such as heat exchangers and the like has plagued the hydrocarbon treatment industries for years. Typical of the processes in which carbon formation poses a problem are the pyrolysis of benzene and its homologues to form polyaryls; the pyrolysis of paraffins to form ethylene, propylene, butadiene and the like; the pyrolysis of various alkylbenzenes to produce styrene and its derivatives; the pyrolysis of various olefins, paraffins or mixtures thereof to produce diolefins, and like pyrolysis reactions.

One proposed solution to the carbon formation problem in pyrolysis reactions is the use of AISI "400" series steels as the reactor material. Although the use of AISI "400" series steels apparently solves the carbon formation problem, these steels do not possess good physical properties (strength) at temperatures over about 550 degrees centigrade. Ordinarily, pyrolysis reactions, as contemplated by the present invention are run at temperatures of from about 700 to about 900 degrees centigrade in order to obtain an efficient conversion of feed to the desired product. Some pyrolysis reactions may be run at lower temperatures. The reactor metal, however, is usually at a temperature considerably above that of the material undergoing pyrolysis, sometimes as much as 100 degrees centigrade or more. Because the reaction is generally endothermic, heat must be supplied from outside the reactor. Thus, the temperature gradient.

The better known high temperature stainless steels (AISI "300" steels) generally contain both chromium and nickel. These steels generally have good strength at pyrolysis reaction temperatures, but nickel tends to catalyze the formation of carbon. Thus, the AISI "300" steels are not usually suitable by themselves as reactor materials. It has been proposed to construct a reactor having an outer shell of AISI "300" steel metallurgically bonded to an inner surface of AISI "400" steel, thereby taking advantage of the desirable properties of both steels. This method is apparently successful, but is very expensive. Metallurgical bonding of the two steels is complex and further fabrication requires special techniques which are both time consuming and expensive.

We have discovered that reactors and other high temperature equipment constructed of a suitable chromium-manganese steel have good high temperature strength and carbon formation inhibition characteristics comparable with those of AISI "400" steels.

Suitable steels in accordance with the present invention generally contain from about 10 to about 20 percent manganese, a maximum of about 0.75 percent nickel, from about 17 to about 18.5 percent chromium, and the balance iron and the usual residual impurities.

The present invention contemplates that conventional methods of reactor construction will be used, except that "suitable" steels, as hereindefined, constitute the reaction contacting surface. Appropriate reactions for the reactor of the present invention are pyrolysis, synthesis, condensation, oxidation dehydration, and the like, performed at temperatures above 500° centigrade to the structural limit of the reactor material, usually about 1000–1100° centigrade. The reactor of the present invention is particularly suited to reactions conducted at temperatures above 650° centigrade.

A better understanding of the present invention may be had in light of the following examples which are set forth to illustrate, and are not to be construed to limit, the present invention.

*Example 1*

A reactor was fabricated of a chromium-manganese steel having the nominal composition:

|  | Percent |
|---|---|
| Carbon | 0.08 to 0.12 |
| Manganese | 14.50 to 16.00 |
| Phosphorus (maximum) | 0.045 |
| Sulfur (maximum) | 0.03 |
| Nickel | 0.05 to 0.75 |
| Silicon | 0.03 to 1.00 |
| Nitrogen | 0.35 to 0.50 |
| Chromium | 17.00 to 18.50 |

Balance iron and residual impurities in minor amounts.

The reactor was in the form of a tube, 36 inches in length and having a ¾ inch inner diameter, mounted vertically in a two zone electric heater. Chemical and heat resistant saddles were used to pack the upper portion of the reactor tube. Temperature of the packed upper portion of the reactor was maintained at about 400 degrees centrigrade, thereby insuring full vaporization of the feed.

With the lower section of the reactor tube maintained at a temperature of about 800 degrees centigrade, cis-butene-2 and steam were introduced to the upper portion of the reactor at rates of 129.5 and 20.3 grams per hour, respectively. Product was recovered from the lower end of the reactor by means suitable to cool the effluent gases, strip the product of steam condensate, and meter the product.

After more than six hours of operation, the reactor was dismantled and examined for carbon formation. No measurable accumulation of carbon was observed. Analysis of the product gases indicated that about 0.25 gram of carbon monoxide and 0.11 gram of carbon dioxide were formed per hundred grams of cis-butene-2 fed to the reactor. Carbon monoxide and dioxide are usually formed by reaction of carbon with steam. Low concentration of these gases in the product stream indicates that very little carbon was formed in the reaction.

About 15.9 grams of butadiene per hundred grams of cis-butene-2 fed were produced, which is generally considered a good conversion. The balance of the product stream contained a wide variety of other useful hydrocarbons.

*Comparative example*

For comparison, a reactor substantially the same as the reactor of Example 1 was fabricated of an AISI TP304 steel having the nominal composition:

| | Percent |
|---|---|
| Carbon (maximum) | 0.08 |
| Manganese (maximum) | 2.00 |
| Phosphorus | 0.03–0.04 |
| Sulfur (maximum) | 0.03 |
| Silicon (maximum) | 0.75 |
| Chromium | 18–20 |
| Nickel | 8–11 |

Balance iron and residual impurities in minor amounts.

The reactor was positioned and operated at substantially the same temperatures and in substantially the same manner as the reactor of Example 1. Cis-butene-2 and steam were fed to the reactor at substantially the same rates described in Example 1 for about six hours. After the six hour run, the reactor was dismantled and examined for carbon formation. The inner wall of the reactor in the lower, unpacked, reaction zone was covered with loose carbonaceous material which had the appearance of lampblack.

Analysis of the product gases indicated that carbon monoxide and dioxide production was about fifty and twelve times greater, respectively, than in the reactor of Example 1.

Butadiene production compared favorably with Example 1, but the excessive formation of carbon, carbon monoxide and carbon dioxide resulted in a substantial depletion of other useful hydrocarbons in the product stream.

*Example 2*

Employing the reactor of Example 1, with the unpacked reaction zone at a temperature of about 675 degrees centigrade, ethylbenzene and steam were fed at rates of 20.6 and 25.2 grams per hour respectively.

For comparison, a reactor substantially the same except that it was fabricated on AISI-TPP446* steel was employed at the same feed rates and temperatures. Both reactors were operated for a period of about 119 hours.

Product obtained from the chromium-manganese steel reactor compared favorably with that obtained from the chromium steel (AISI-TP446) reactor. Thus, the reactor of the present invention has the advantages of AISI "400" series steels and additionally the advantage of high temperature strength comparable to or better than that of chromium-nickel steels.

*Example 3*

In substantially the same manner as described above in Examples 1 and 2, the reactor material of the present invention may be employed in processes wherein benzene, its homologues or mixtures thereof are pyrolyzed to form polyaryls; paraffins are pyrolyzed to form ethylene, propylene, butadiene and the like; various alkylbenzenes are pyrolyzed to form styrene and its derivatives, and various olefins, paraffins or mixtures thereof are pyrolyzed to produce diolefins with substantially the same advantageous results.

*Example 4*

Using the reactor of Example 1, other high temperature hydrocarbon reactions such as; oxidation, synthesis, dehydration and the like, wherein a hydrocarbon is vaporized and subjected to high temperatures, may be performed with similar freedom from carbon formation in the reactor.

Various modifications may be made in the present invention without departing from the spirit or scope thereof and it is to be understood that we limit ourselves only as defined in the appended claims.

We claim:

1. In a method wherein a hydrocarbon is vaporized and subjected to temperatures above 500 degrees centigrade in high temperature equipment, the improvement which minimizes carbon formation on the sides of said equipment comprising providing as the hydrocarbon contacting material a steel containing from about 10 to about 20 percent manganese, a maximum of about 0.75 percent nickel and from about 17 to about 18.5 percent chromium.

2. In a method wherein a hydrocarbon is vaporized and subjected to temperatures above 500 degrees centigrade in a reactor, the improvement which minimizes carbon formation on the sides of said reactor comprising providing as the reactor material a steel containing from 0.08 to 0.2 percent carbon, from 14.50 to 16.00 percent manganese, a maximum of 0.045 percent phosphorus, a maximum of 0.03 percent sulfur, from 0.05 to 0.75 percent nickel, from 0.03 to 1.00 percent silicon, from 0.35 to 0.50 percent nitrogen and from 17.00 to 18.50 percent chromium.

---

* AISI-TP446 steel has the nominal composition:

| | Percent |
|---|---|
| Carbon (maximum) | 0.20 |
| Manganese (maximum) | 1.50 |
| Silicon (maximum) | 0.75 |
| Nickel (maximum) | 0.50 |
| Phosphorus (maximum) | 23.0–30.0 |
| Sulfur (maximum) | 0.03 |
| Nitrogen | 0.10–0.25 |

Balance iron and residual impurities in minor amounts.

---

References Cited by the Examiner

UNITED STATES PATENTS 1,938,609  12/1933  Reilly _____ 260—670

OTHER REFERENCES

Archer, "High Chromium Alloys in the Refinery," Refiner & Natural Gasoline Manufacturer, vol. 20, No. 7, July 1941, pp. 66–85 (page 68 particularly relied upon).

DELBERT E. GANTZ, *Primary Examiner.*

C. R. DAVIS, *Assistant Examiners.*